(12) United States Patent
Williams et al.

(10) Patent No.: US 9,487,062 B2
(45) Date of Patent: Nov. 8, 2016

(54) OIL FILLED HEATER CORE

(71) Applicant: Toyota Motor Engineering & Manufacturing North America, Inc., Erlanger, KY (US)

(72) Inventors: Alan K. Williams, West Bloomfield, MI (US); Chad A. Barnes, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 649 days.

(21) Appl. No.: 13/655,770

(22) Filed: Oct. 19, 2012

(65) Prior Publication Data

US 2014/0110387 A1  Apr. 24, 2014

(51) Int. Cl.
| | |
|---|---|
| *B60L 1/02* | (2006.01) |
| *B60H 1/22* | (2006.01) |
| *B60H 1/00* | (2006.01) |
| *F28D 1/03* | (2006.01) |
| *F28D 15/00* | (2006.01) |
| *F28D 1/02* | (2006.01) |
| *F24H 3/08* | (2006.01) |

(52) U.S. Cl.
CPC ........ *B60H 1/2215* (2013.01); *B60H 1/00392* (2013.01); *F24H 3/082* (2013.01); *F28D 1/024* (2013.01); *F28D 1/0333* (2013.01); *F28D 15/00* (2013.01); *B60H 2001/2296* (2013.01)

(58) Field of Classification Search
CPC ............ B60H 1/00392; B60H 1/2215; B60H 2001/2296; F24H 3/04; F28D 15/00; F28D 1/024; F28D 1/0333

USPC .................................................. 219/202–208
See application file for complete search history.

(56) References Cited

U.S. PATENT DOCUMENTS

| | | | | | |
|---|---|---|---|---|---|
| 2,439,945 | A | * | 4/1948 | Morton | F24H 3/002 392/373 |
| 3,885,126 | A | * | 5/1975 | Sugiyama | B60H 1/0025 126/400 |
| 4,211,278 | A | * | 7/1980 | Bennett et al. | 165/130 |
| 5,299,278 | A | * | 3/1994 | Heller | 392/358 |
| 5,699,960 | A | * | 12/1997 | Kato et al. | 237/2 A |
| 5,871,041 | A | | 2/1999 | Rafalovich et al. | |
| 6,263,157 | B1 | * | 7/2001 | De'Longhi | 392/378 |
| 6,896,047 | B2 | * | 5/2005 | Currle et al. | 165/204 |
| 6,901,213 | B2 | | 5/2005 | Bing | |
| 2005/0265702 | A1 | | 12/2005 | Birdsell et al. | |
| 2011/0180617 | A1 | | 7/2011 | Saito et al. | |

\* cited by examiner

*Primary Examiner* — Sang Y Paik
(74) *Attorney, Agent, or Firm* — Dinsmore & Shohl LLP

(57) ABSTRACT

A heater system for an electric vehicle that is void of engine coolant. The heater system can include an air duct having an opening into a passenger compartment of the vehicle and a heater unit attached to the air duct. The heater unit can have a self-contained quantity of oil within an oil reservoir and an oil channel in fluid communication with the oil reservoir. The oil channel can be located between a front wall and a back wall of the heater unit and the unit can also have an electric heating element at least partially within the oil reservoir. The electric heater unit can be operable to heat oil in the oil reservoir and thereby result in the oil flowing through the oil channel and heating the front wall and the back wall of the unit.

12 Claims, 2 Drawing Sheets

US 9,487,062 B2

OIL FILLED HEATER CORE

FIELD OF THE INVENTION

The present invention is related to a heater for a motor vehicle, and in particular to a heater having an isolated heating fluid and no need for entry and exit hoses from an engine block and/or fluid heater.

BACKGROUND OF THE INVENTION

Heaters within or as part of motor vehicles are known. Such heaters typically use fluid such as water that is heated via heat transfer from an internal combustion, transfer of heat from the water to heater coil fins, which then transfers heat to air flowing over the fins and into a passenger compartment. Such heater units typically require a heater core with the heated fluid flowing therethrough, the heated fluid being cycled through an engine block of the vehicle. In addition, an entry hose, an exit hose and a thermostat are required to regulate the temperature and flow of fluid through the heater core.

Although such types of heater units are known and used extensively in motor vehicles having internal combustion engines, the use of such a unit with an electric vehicle requires heating of the fluid without the use or presence of an internal combustion engine. Therefore, an improved heater unit having an isolated heating fluid source for use with an electric vehicle would be desirable.

SUMMARY OF THE INVENTION

A heater system for an electric vehicle that is void of engine coolant is provided. The heater system can include an air duct having an opening into a passenger compartment of the vehicle and a heater unit attached to the air duct. The heater unit can have a self-contained quantity of oil within an oil reservoir and an oil channel in fluid communication with the oil reservoir. The oil channel can be located between a front wall and a back wall of a heater element and the unit can also have an electric heating element at least partially within the oil reservoir. The electric heater unit can be operable to heat oil in the oil reservoir and thereby result in heated oil flowing through the oil channel and transferring heat to the front wall and the back wall of the heater element.

The air duct of the system is operable for air to flow therethrough and over at least one of the front wall and/or the back wall of the heater element and provide heated air to the passenger compartment of the motor vehicle. The oil channel can have a first channel portion through which heated oil from the oil reservoir flows through and a second channel portion through which cooled oil that has passed through the first channel portion flows through. It is appreciated that the oil can be heated in the oil reservoir by the electric heating element before flowing into and through the first channel portion, heat can be transferred from the heated oil to outer surfaces of the heater element, and oil cooled due to the heat transfer can flow back to the oil reservoir to be re-heated. It is also appreciated that heated oil will have a lower density than cooled oil and thus oil heated in the oil reservoir will have a tendency to rise in the body of the oil, e.g. flow upwardly through the first channel portion, and cooled oil will have a tendency to fall in the body of the oil, e.g. flow downwardly through the second channel portion. In this manner, the oil flows and/or cycles through the self-contained heater unit.

In some instances, the heater unit can have a plurality of oil channels between a plurality of front walls and back walls, the plurality of oil channels being in fluid communication with the oil reservoir such that heated oil from the oil reservoir flows through the first channel portion of each oil channel, and thereby heating the front wall and the back wall, before being cooled and flowing back to the oil reservoir through the second channel portion.

The heater system can include a fan in fluid communication with the duct, the fan being operable to force air through the duct and over at least one of the plurality of front walls and/or plurality of back walls. Heat conduction from the front wall and/or back wall of at least one of the oil channels results in heated air passing into the passenger compartment of the vehicle. In some instances, the fan can be located upstream of the heater unit and thus pushes air over at least one of the plurality of front walls and/or plurality of back walls. In other instances, the fan can be located downstream of the heater unit and thus during operation pulls air over at least one of the plurality of front walls and/or plurality of back walls.

The heater system can also include an air conditioning unit in fluid communication with the air duct and operable to provide cooled air to be forced over the at least one of the plurality of front walls and/or the plurality of back walls of the heater unit. In this manner, cooled air from the air conditioning unit can be used to cool the heater unit. In addition, the heating element can be a 120 volt electric heating element that can be energized by a control unit that can regulate power thereto as a function of a desired passenger compartment temperature. In this manner, and in combination with a fan speed of the fan, the temperature and amount of heated air flowing into the passenger compartment can be controlled.

DETAILED DESCRIPTION OF THE INVENTION

A heater system for an electric and/or hybrid gas/electric vehicle is provided. The heater system can use and/or include an oil heater that heats oil in order to transfer heat to a heating element or fin which subsequently transfers heat to air passing over the element. The heated air is naturally provided to a passenger compartment of the electric vehicle. The oil heater can have an electric heating element that heats oil within an oil reservoir and the heated oil can flow and/or rise up through a first channel portion of the heating fin and flow through and/or down a second channel portion back into the oil reservoir.

As the heated oil flows through the first channel portion, heat from the oil is transferred to an outer surface of the heating fin, which subsequently affords for heat to be transferred to air passing over the element fin. Transfer of heat from the oil to the outer surface of the fin, and from the outer surface of the fin to the air, results in withdrawal of heat from the oil. Therefore, heat is withdrawn from the oil and the oil is cooled as it flows through the first channel portion. Finally, the cooled oil flows back to the oil reservoir through the second channel portion where it can be reheated. In this manner, a self-contained heater unit cycles a heating fluid therethrough.

The heater system can include a fan that forces air over the heater fin and into the passenger compartment of the electric vehicle. The fan can have one or more rotational speeds and may or may not be a fan that blows cold air from an air conditioning unit into the passenger compartment. As such, the heater system provides a heater unit that does not require engine coolant to provide heat for the vehicle. Stated differently, the heater unit can be a self-contained unit with no entry or exit hoses, thereby providing a simple and cost efficient heater system for the vehicle.

Figure 1:
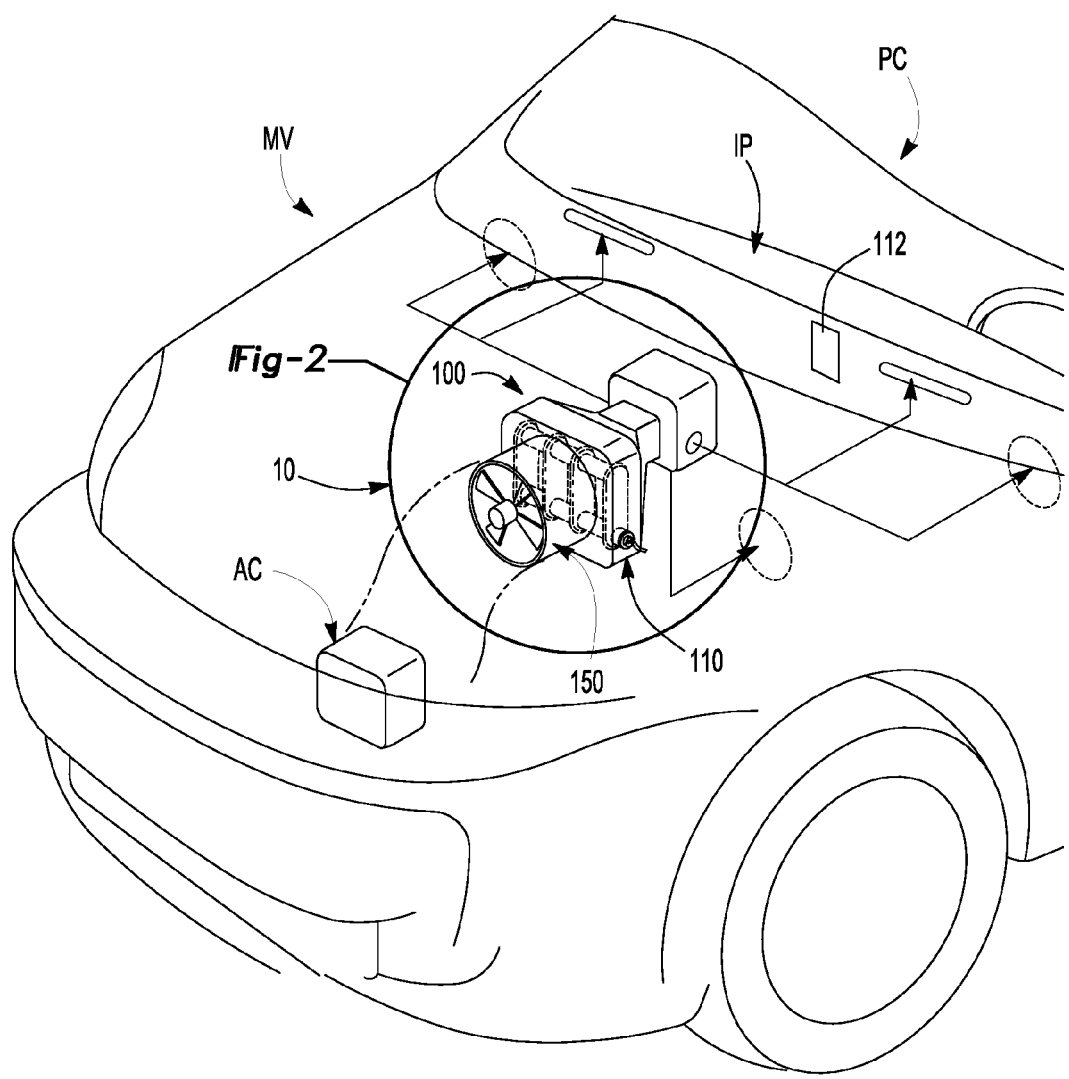
FIG. 1 is a perspective view of a motor vehicle having a heater system according to an embodiment of the present invention.

Turning now to FIG. 1, a motor vehicle MV is shown with a passenger compartment PC, an instrument panel IP, and a heater system 10. The heater system 10 can include a heater unit 100 and a control unit 112 that is part of the instrument panel IP as known to those skilled in the art. Also included as part of the heater system 10 can be a fan 150 and an air duct 110, along with an optional air conditioner unit AC which can be in fluid communication with the heater unit 100.

Figure 2:
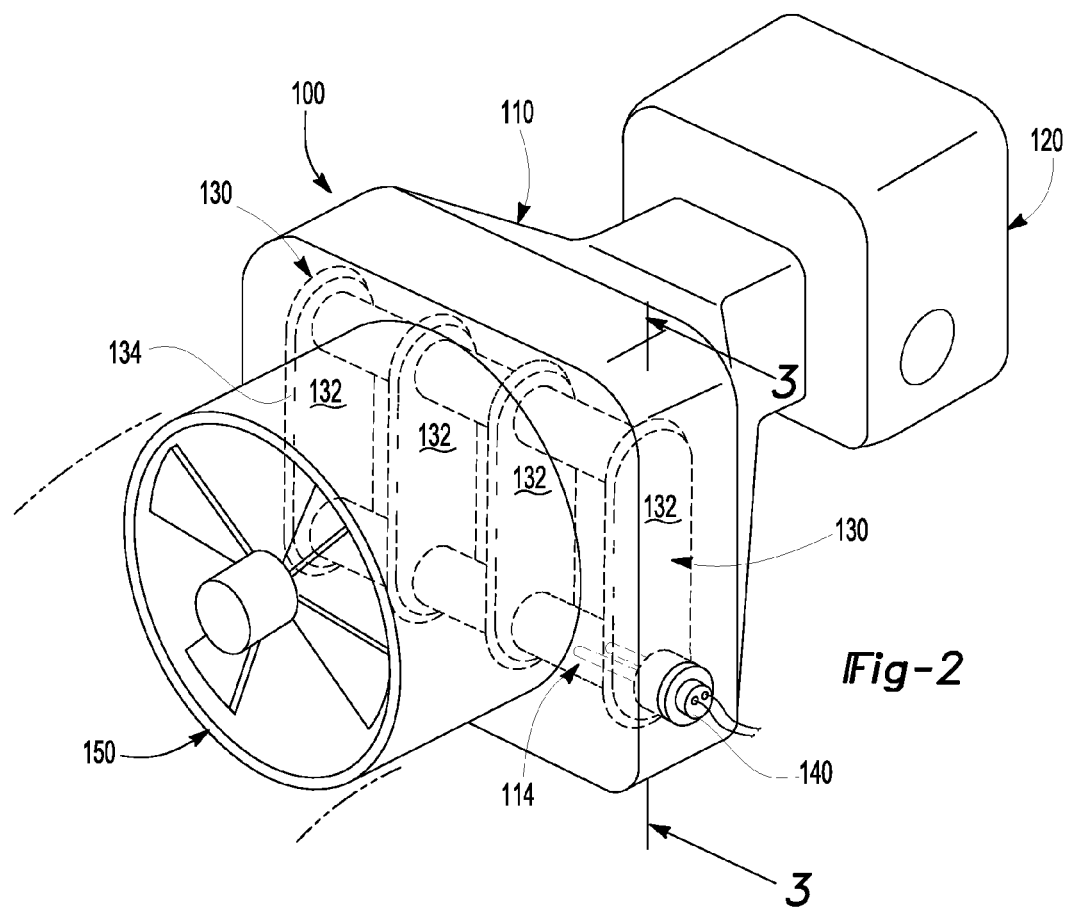
FIG. 2 is an enlarged view of the heater unit shown in FIG. 1.

FIG. 2 provides a more detailed and enlarged view of the heater unit 100 shown in FIG. 1. The heater unit 100 can include the air duct 110 and one or more heater elements or fins 130 that have a front wall 132 and a back wall 134. The heater unit 100 can also have an oil reservoir 114 that contains heating oil that can be heated by an electric heating element 140. As the oil in the oil reservoir 114 is heated by the electric heating element 140, it can rise through a first channel portion 136 as illustrated by the up arrows in FIG. 3. In addition, air can be forced to flow over the heater element 130 with heat conducted from the heated oil in the first channel portion 136 being transferred to the outer surfaces of the front wall 132 and/or the back wall 134, such heat also then being transferred to the air passing over the element.

It is appreciated that as heat is conducted or transferred from the heater element 130 to the air, that the oil flowing up through the first channel portion 136 will be cooled. Naturally, as the oil is cooled its density increases and thus the cooled oil has a tendency to flow back down to the oil reservoir 114 through a second channel portion 138 as illustrated by the down arrows in FIG. 3. It is appreciated that the exact shape of the heater element 130 can be different than shown in the figures. For example, the front wall 132 and/or back wall 134 can have a corrugated shape in which oil flows through open channels between the front and back walls. It is also appreciated from FIGS. 2 and 3 that the heater unit 100 can have a plurality of heater elements 130 with a front wall 132 and/or back wall 134, and each of the heater element 130 can have a self-contained quantity of oil within an oil reservoir 114.

Figure 3:
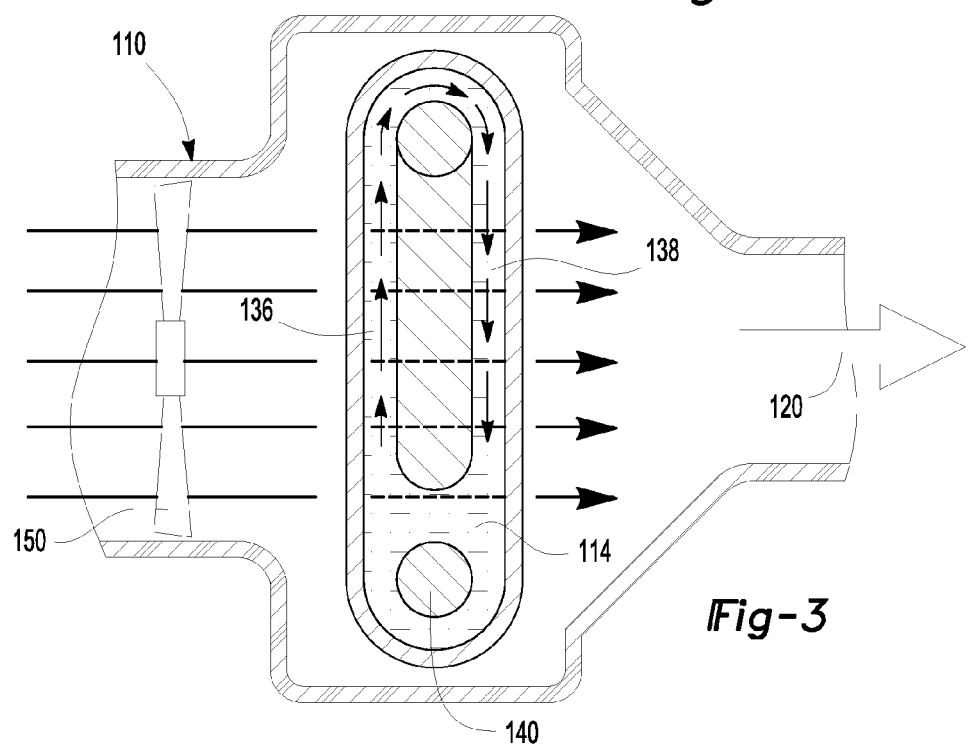
FIG. 3 is a side cross-sectional view of a portion of the heater unit shown in FIG. 2.

In some instances, the fan 150 can force the air, i.e. push the air, over the heater elements 130 as shown in FIGS. 2 and 3. In the alternative, the fan 150 can be located downstream from the heater unit 100 and thus pull air across the heater elements 130. As shown in FIGS. 1-3, the air duct 110 and the fan 150 positioned within the air duct 110 generally span across a length of all the heater elements 130 of the heater unit 100.

The control unit 112 can be used to regulate the amount of energy/electricity provided to the electric heating element 140 and thus control the heat provided to the oil in the oil reservoir 114. This control unit in combination with a rotational speed of the fan 150 can be used to control the temperature of air flowing into the passenger compartment. In addition, and in the event that cooling of the heater unit 100 is desired at a faster rate than can be acquired or obtained by simply termination of power to the electric heating element 140, the air conditioning unit AC can be used to provide cooled air over the heater elements 130.

It is appreciated that with an electric vehicle having relatively high voltage, i.e. 120 volt source, that such a heater system 10 can be practically and/or economically feasible for providing heat to a passenger compartment of the vehicle. In addition, with the self-contained oil heater, hoses and/or liquid from an engine compartment is not required to produce heat. Thus, a simple and economically feasible heater unit is provided for an electric vehicle.

It will be evident to those skilled in the art that various modifications, changes, and the like to the invention described herein can be made and yet fall within the scope of the invention. As such, it is the claims and all equivalents thereof that define the scope of the invention.

We claim:

1. A heater system for a motor vehicle comprising:
   an electric vehicle void of engine coolant;
   an air duct having an opening into a passenger compartment of the electric vehicle;
   a heater unit attached to said air duct, said heater unit having a plurality of heater elements and a self-contained quantity of oil within an oil reservoir, each of said plurality of heater elements having an oil channel located between a front wall and a back wall of each of said plurality of heater elements and in fluid communication with said oil reservoir, said heater unit also having a electric heating element at least partially within said oil reservoir, said electric heating element operable to heat oil in said oil reservoir and result in said oil flowing through each oil channel and heating said front wall and said back wall of each of aid plurality of heating elements, said oil flowing through each oil channel flowing back to said oil reservoir upon cooling;
   a fan in fluid communication with said duct, said fan generally spanning across a length of all of said plurality of heater elements and operable to force air through said duct and over said front wall of each of said plurality of heater elements; and
   an air conditioning unit in fluid communication with said duct and operable to provide cooled air to be forced over said front wall of each of said plurality of heater elements.

2. The heater system of claim 1, wherein each oil channel has a first channel portion and a second channel portion, said first channel portion containing heated oil flowing out from said oil reservoir and said second channel portion containing cooled oil having passed through said first channel portion.

3. The heater system of claim 2, wherein said oil is heated in said oil reservoir by said electric heating element before flowing into and through each first channel portion.

4. The heater system of claim 1, wherein said fan is located upstream of said heater unit and pushes the air over said plurality of heater elements.

5. The heater system of claim 1, wherein said fan is located downstream of said heater unit and pulls the air over said plurality of heater elements.

6. A motor vehicle comprising:
   an electric vehicle void of engine coolant, said electric vehicle having a passenger compartment, an instrument panel and an HVAC system, said HVAC system having an air duct, a fan, a heater unit, an air conditioning unit and a control unit, said HVAC system operable to provide heated and cooled air into said passenger compartment;

said heater unit having a plurality of heater elements with a plurality of oil channels and a plurality of self-contained oil reservoirs such that each of said plurality of heater elements has a self-contained oil reservoir, said fan generally spanning across a length all of said plurality of heater elements, each of said plurality of oil channels in fluid communication with said plurality of oil reservoirs such that each of said plurality of self-contained oil reservoirs is in fluid communication with a separate oil channel, said heater unit also having an electric heating element located at least partially within each of said plurality of self-contained oil reservoirs, said heater unit operable to heat oil within each of said plurality of self-contained oil reservoirs, flow oil through each of said plurality of oil channels while said fan forces air over said heater unit and provide heated air into said passenger compartment via heat transfer from each of said plurality of oil channels to the air forced over said heater unit;

said air conditioning unit in fluid communication with said air duct and operable to provide cooled air to be forced over said heater unit and cool said heater unit.

7. The motor vehicle of claim 6, further comprising oil within each of said oil reservoirs and said oil channels.

8. The motor vehicle of claim 7, wherein each of said oil channels with said oil is located between a front wall and a back wall, said front wall and said back wall being heated when oil from each of said oil reservoirs is heated by said electric heating element and flows through each of said oil channels.

9. The motor vehicle of claim 8, wherein said fan is operable to force air through said air duct and over at least one of said heated front wall and said heated back wall and provide heated air into said passenger compartment.

10. The motor vehicle of claim 9, wherein said air duct is in fluid communication with said heater unit and said air conditioning unit, said air conditioning unit located upstream of said heater unit and operable to provide cooled air to flow over said at least one of said heated front wall and said heated back wall and cool said heater unit.

11. The motor vehicle of claim 6, wherein said electric heating element is a 120 volt electric heating element.

12. The motor vehicle of claim 6, wherein said control unit is operable to energize said electric heating element as a function of a desired passenger compartment temperature.

* * * * *

UNITED STATES PATENT AND TRADEMARK OFFICE
CERTIFICATE OF CORRECTION

| | | |
|---|---|---|
| PATENT NO. | : 9,487,062 B2 | Page 1 of 1 |
| APPLICATION NO. | : 13/655770 | |
| DATED | : November 8, 2016 | |
| INVENTOR(S) | : Alan K. Williams et al. | |

It is certified that error appears in the above-identified patent and that said Letters Patent is hereby corrected as shown below:

In the Specification

In Column 3, Line 53, before "130 can have a self-contained quantity of", delete "element", insert --elements--, therefor.

In Column 3, Line 61, after "across a length of all", insert --of--.

Signed and Sealed this
Seventh Day of February, 2017

Michelle K. Lee
*Director of the United States Patent and Trademark Office*